Dec. 5, 1967  M. CAMERON  3,356,192
AUTOMATIC VARIABLE-SPEED PRESSURE GOVERNOR
Filed March 1, 1965  3 Sheets-Sheet 1

INVENTOR
MARTIN CAMERON
By Linton and Linton
ATTORNEYS

INVENTOR
MARTIN CAMERON

INVENTOR
MARTIN CAMERON 3,356,192
AUTOMATIC VARIABLE-SPEED PRESSURE
GOVERNOR
Martin Cameron, Bowelling, Western Australia, Australia
Filed Mar. 1, 1965, Ser. No. 435,890
2 Claims. (Cl. 188—187)

ABSTRACT OF THE DISCLOSURE

The present governor employs a fixed shaft having a coil spring thereon, a block slideable on said shaft with the coil spring between the block and a shoulder on the shaft, a drive unit rotatable on said shaft having a plurality of weights pivoted thereto, a plate engaging a friction surface on said block and arms connecting at least the weights and said plate.

Description

The object of the invention is to provide a governor which is relatively simple in construction and which can be used in conjunction with the infinitely variable gear mechanism described in Australian patent specification No. 64,652/60.

In one form the invention resides in a governor comprising a fixed shaft, a coiled spring positioned around the shaft and bearing against a movable block slidably mounted on one end of the shaft, a rotating unit rotatably mounted on the shaft and having a pair of weights mounted thereon, the weights being connected to a plate bearing against a friction surface on the movable block against the action of the coiled spring.

The invention will be better understood by reference to the following description of the specific embodiments thereof shown in the accompanying drawings, wherein.

Figure 1:
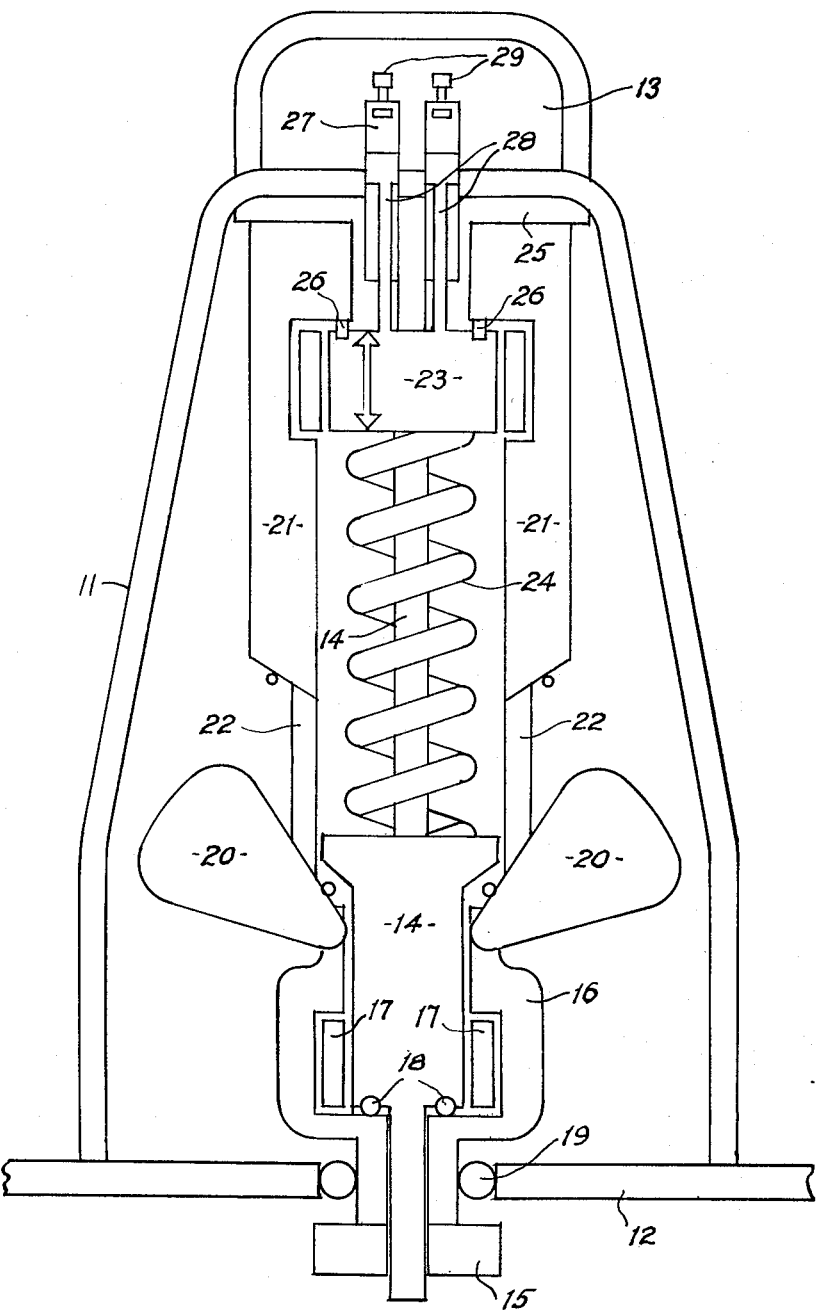
FIG. 1 is a sectional elevation of one embodiment.

Referring now to the embodiment shown in FIG. 1 of the drawings, the governor is housed in a housing 11 fixed to a mounting plate 12, the outer end of the housing being provided with a compartment 13 in which hydraulic fluid is stored. A fixed shaft 14 is centrally mounted with the housing, the inner end passing through an opening in the plate 12 and having a drive unit 15 mounted on the portion projecting beyond the mounting plate. The drive unit 15 is connected to a rotating member 16 which surrounds the inner end of the fixed shaft 14. Roller bearings 17 and ball bearings 18 are provided between the rotating member and the shaft and ball bearings 19 are positioned around the rotating member 16 where it passes through the mounting plate. Counterweights, i.e. flyweights, 20 are pivotally mounted in diametrally opposed positions on the rotating member 16 within the governor housing. Each counterweight is connected to an outer rotating unit 21 by means of connecting arms 22. A movable block 23 is slidably mounted on the outer end of the fixed shaft 14 and a coiled spring 24 is positioned around the shaft so that one end bears against the movable block 23. The outer end of the outer rotating unit 21 bears against a stop plate 25 fixed to the outer end of the housing and roller bearings are interposed between the movable block and the outer rotating unit. The outer end of the movable block 23 is provided with a friction surface 26 which bears against a step on the outer rotating unit 21. A pair of hydraulic cylinders 27 are mounted so that one end thereof projects into the hydraulic fluid compartment 13 and the other end projects into the housing. The free ends of the piston rods 28 are connected to the block 23. The ends of the hydraulic cylinders within the compartment 13 are fitted with slow return valves 29.

Figure 2:
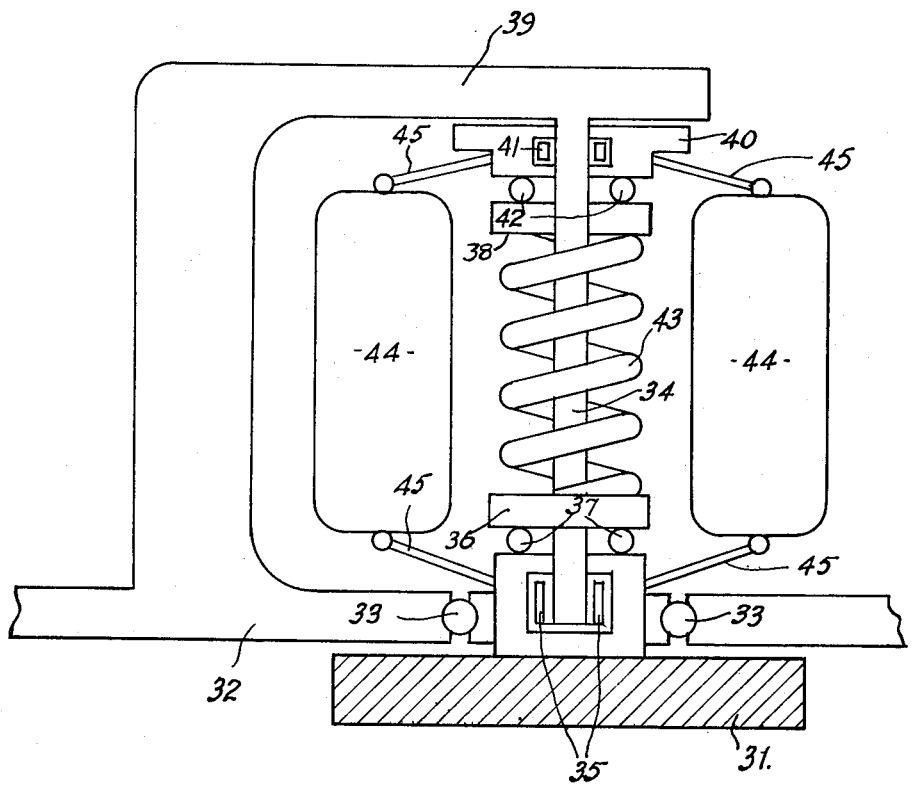
FIG. 2 is a sectional elevation of a second embodiment.

In the embodiment shown in FIG. 2 of the drawings a pinion 31 coupled to the mechanism to which the governor is to be connected passes through an opening in a mounting plate 32, ball bearings 33 being positioned around the pinion. One end of a shaft 34 is mounted in a recess in the pinion, roller bearings 15 being positioned between the shaft and the walls of the recess. A collar 36 is fixed to the shaft and ball bearings 37 are interposed between the collar and the end of the pinion. A movable block 38 is slidably mounted on the other end of the shaft 34 which is supported by a bridle 39. A plate 40 is slidably mounted on the other end of the shaft 34, roller bearings 41 being interposed between the shaft and the plate. The movable block 38 is provided with a friction surface 42 which bears against the plate 40. A coiled spring 43 is positioned around the shaft 34 between the collar 36 and the movable block 38. Counterweights 44 are pivotally connected to the outer ends of arms 45 the inner ends of which are pivotally connected to the inner end of the pinion 31 and to the plate 40.

Figure 3:
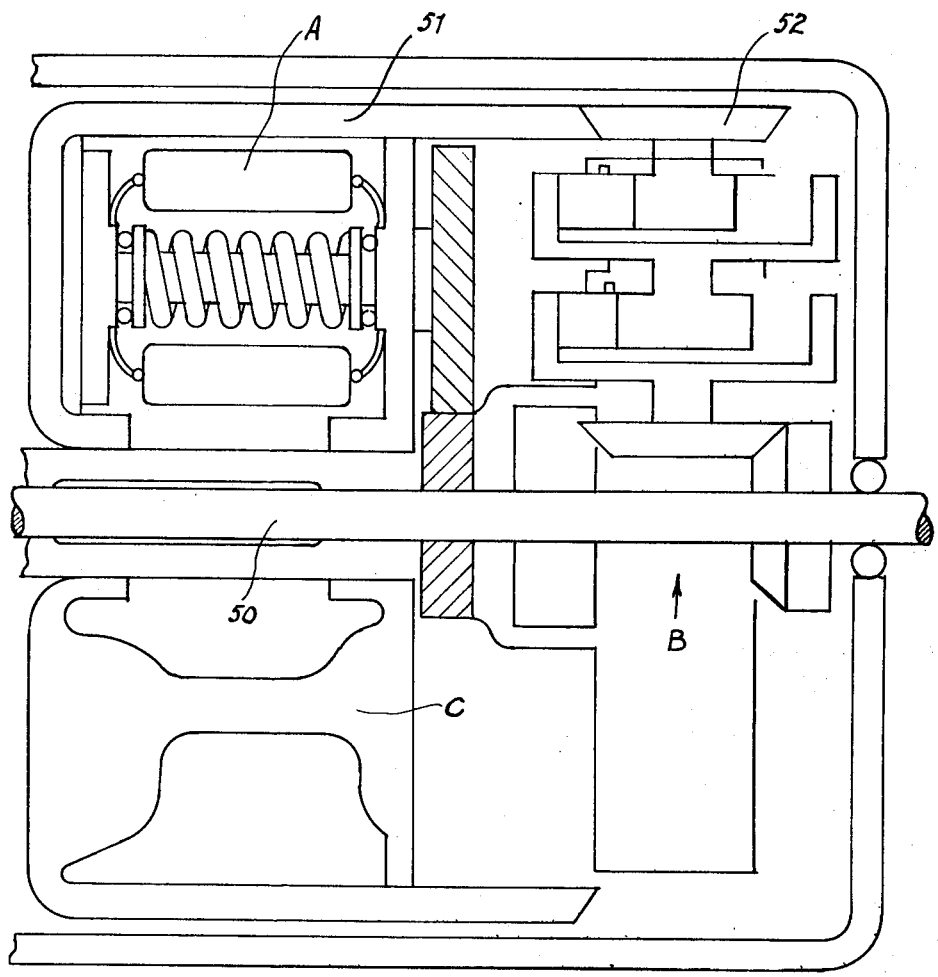
FIG. 3 is a diagrammatic sectional elevation showing how the governor is incorporated in the infinitely variable gear mechanism of Australian patent application No. 64,652/60.

As shown in FIG. 3 of the drawings, the governor A is mounted on the bevel ring wheel 51 which is coupled to a pinion 52 coupled to the gear mechanism B which is substantially as is described in Australian patent specification No. 64,652/60. The weight of the governor A is counterbalanced by a counterweight C.

I claim:
1. A governor comprising a fixed shaft, a coil spring positioned around and bearing at one end against said shaft, a block slideably mounted on one end portion of said shaft and having one side bearing against said spring, friction surfaces on the other side of said block, a drive member rotatably mounted on the other end portion of said shaft, a plurality of flyweights pivotally connected to said drive member, a plate bearing against said friction surfaces, bearing means for guiding said plate for axial movement relative to said shaft, and a plurality of arms each connecting one of said flyweights and said plate to move said plate axially in response to movements of said flyweights.

2. A governor as claimed in claim 1 including a second plurality of arms each providing the pivotal connection between one of said flyweights and said driven member.

References Cited

UNITED STATES PATENTS

| | | | |
|---|---|---|---|
| 779,284 | 1/1905 | Johnson et al. | 188—187 X |
| 1,232,848 | 7/1917 | Rosenbaum | 188—187 |
| 1,329,050 | 1/1920 | Louden | 188—187 |
| 2,372,579 | 3/1945 | Jefferson et al. | 73—535 X |

RICHARD C. QUEISSER, Primary Examiner.

JAMES J. GILL, Assistant Examiner.